(12) United States Patent
Corrin et al.

(10) Patent No.: US 10,577,529 B2
(45) Date of Patent: Mar. 3, 2020

(54) METHOD FOR CONTROLLING BACTERIA IN FORMATIONS USING MOLYBDATE

(71) Applicant: BIOSUITE, LLC, Houston, TX (US)

(72) Inventors: Edward Corrin, Houston, TX (US); Michael Gurecki, Houston, TX (US); Michael Harless, Houston, TX (US)

(73) Assignee: BIOSUITE, LLC, Houston, TX (US)

(*) Notice: Subject to any disclaimer, the term of this patent is extended or adjusted under 35 U.S.C. 154(b) by 0 days.

(21) Appl. No.: 16/030,393

(22) Filed: Jul. 9, 2018

(65) Prior Publication Data

US 2019/0010380 A1    Jan. 10, 2019

Related U.S. Application Data

(60) Provisional application No. 62/530,701, filed on Jul. 10, 2017.

(51) Int. Cl.
| | | |
|---|---|---|
| *E21B 43/16* | (2006.01) | |
| *C09K 8/532* | (2006.01) | |
| *E21B 43/26* | (2006.01) | |
| *E21B 43/25* | (2006.01) | |

(52) U.S. Cl.
CPC .............. *C09K 8/532* (2013.01); *E21B 43/16* (2013.01); *E21B 43/25* (2013.01); *E21B 43/26* (2013.01); *C09K 2208/20* (2013.01)

(58) Field of Classification Search
None
See application file for complete search history.

(56) References Cited

U.S. PATENT DOCUMENTS

| | | | | |
|---|---|---|---|---|
| 5,405,531 A | * | 4/1995 | Hitzman | A01N 59/00 166/307 |
| 6,534,448 B1 | | 3/2003 | Brezinski | |
| 9,683,433 B2 | * | 6/2017 | Durham | C09K 8/68 |
| 2004/0211566 A1 | | 10/2004 | Slabaugh et al. | |
| 2010/0012331 A1 | * | 1/2010 | Larter | C09K 8/58 166/401 |
| 2010/0190666 A1 | * | 7/2010 | Ali | C09K 8/68 507/235 |
| 2019/0010379 A1 | * | 1/2019 | Corrin | C09K 8/532 |

OTHER PUBLICATIONS

International Search Report and Written Opinion issued in Application No. PCT/US18/41287, dated Sep. 6, 2018, 8 pages.

* cited by examiner

*Primary Examiner* — Andrew Sue-Ako
(74) *Attorney, Agent, or Firm* — Adolph Locklar

(57) ABSTRACT

A process includes injecting a molybdate or molybdate salt into a hydrocarbon-bearing formation, wherein no biocide is injected into the formation.

5 Claims, No Drawings

METHOD FOR CONTROLLING BACTERIA IN FORMATIONS USING MOLYBDATE

CROSS-REFERENCE TO RELATED APPLICATIONS

This application is a non-provisional application which claims priority from U.S. provisional application No. 62/530,701, filed Jul. 10, 2017, which is incorporated by reference herein in its entirety.

FIELD OF THE DISCLOSURE

Embodiments of the present disclosure generally relate to controlling and reducing bacteria, such as sulfate-reducing bacteria (SRB) in hydrocarbon-bearing formations.

BACKGROUND

Water in hydrocarbon formations may provide a growth media for anaerobic bacteria. Certain anaerobic bacteria, such as SRB, may be problematic in recovery of hydrocarbons from hydrocarbon-bearing formations. For instance, SRB may reduce sulfates to sulfides, which may damage the hydrocarbon-bearing formation. In addition, SRB may form slimes or sludges, reducing the porosity of the formation. Reducing the porosity of the formation may impede recovery of the hydrocarbons from the hydrocarbon-bearing formation. Reduction of porosity may be a particularly acute problem in low porosity formations, such as shale.

Fracturing operations may be used to increase hydrocarbon recovery from hydrocarbon-bearing formations. Fracturing operations make use of fracturing fluids, which are often water-based. Depending on the formation and the fracturing operation method, water-based fracturing fluid may be retained in the formation for extended periods. For instance, small-pore sized, low-porosity shales may retain a significant amount of water-based fracturing fluid. The water retained in the formation from the fracturing operation may provide a growth media for SRB.

Traditional water-based fracturing fluids may include a biocide to control SRB. However, biocides, in particular long-acting biocides such as glutaraldehyde, may present environmental concerns, such as ground water contamination. Short acting biocides, such as oxidizers, may present less of an environmental hazard, but may not be active over the entire time period in which the fracturing fluid is retained by the hydrocarbon-bearing formation.

SUMMARY

A process includes injecting a molybdate or molybdate salt into a hydrocarbon-bearing formation, wherein no biocide is injected into the formation.

DETAILED DESCRIPTION

A detailed description will now be provided. The following disclosure includes specific embodiments, versions and examples, but the disclosure is not limited to these embodiments, versions or examples, which are included to enable a person having ordinary skill in the art to make and use the disclosure when the information in this application is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Certain embodiments of the present disclosure relate to injection of a molybdate or molybdate salt into a formation. Molybdate (Moat) may act as a chemical metabolic inhibitor of the sulfate reduction pathway used by Sulfate-Reducing Bacteria to produce $H_2S$. Molybdate is a growth-inhibiting biostat rather than a biocide. The molybdates and molybdate salts may include sodium molybdate and lithium molybdate.

Molybdates may be introduced into the formation, such as with a fracturing fluid. In certain embodiments of the present invention, molybdates and molybdate salts are added to a fluid to be injected into the hydrocarbon-producing formation, such as a fracturing fluid, in the range of 5 to about 500 ppm, or between 20 and 300 ppm or between 20 and 250 ppm or at least 200 ppm by weight of fluid.

In certain embodiments, no biocide is injected into the formation. In certain embodiments, no nitrate reducing bacteria (NRB) is introduced into the formation.

EXAMPLES

The disclosure having been generally described, the following examples show particular embodiments of the disclosure. It is understood that the example is given by way of illustration and is not intended to limit the specification or the claims.

Example 1

Hydrogen sulfide inhibition was tested in mock-produced water approximating water used in hydraulic fracturing operations and was made to a total dissolved solids concentration of 3% with a mixture of instant ocean and NaCl salts. The water was supplemented with nutrients and sulfate to allow SRB to metabolize and create $H_2S$. The water was spiked with SRB and then treated with the various treatment conditions noted below in Table 3 and sealed. Treatment conditions were: Control: No biocide or nitrate.

250 ppm 12.3 Glut/Quat Biocide: a mixture of glutaraldehyde and a quarternary ammonia compound was prepared NRB Program: (480 ppm $Ca(NO_3)_2$ with 1 ppm live NRB culture.

20 ppm, 40 ppm, 50 ppm, 60 ppm, 80 ppm, 100 ppm, 120 ppm, 150 ppm, and 200 ppm molybdate concentration.

$H_2S$ was measured at intervals using $H_2S$ detecting Draeger tubes. Dissolved $H_2S$ was released into the gas phase with the addition of hydrochloric acid so that $H_2S$ could be measured with the Draeger tubes to get a complete reading of all $H_2S$ produced during the course of the example. Results are found in Table 1.

TABLE 1

| Treatment | Total H2S (ppm) |
|---|---|
| Control | 2805 |
| 250 ppm 12:3 Glut/Quat Biocide | 6 |
| NRB Program (480 ppm CaNO3) | 25 |
| 20 ppm MoO4 | 1974 |
| 40 ppm MoO4 | 1066 |
| 50 ppm MoO4 | 1536 |
| 50 ppm MoO4 | 2262 |
| 60 ppm MoO4 | 1846 |
| 80 ppm MoO4 | 1866 |
| 100 ppm MoO4 | 738 |
| 120 ppm MoO4 | 890 |
| 150 ppm MoO4 | 176 |
| 200 ppm MoO4 | 40 |

In mock produced water, molybdate alone caused a reduction in $H_2S$ formation even at lower concentrations. At concentrations of 150 ppm and above, molybdate was competitive with other proven treatments—Glut/Quat biocide and NRB treatment (480 ppm $Ca(NO_3)_2$ with 1 ppm live NRB culture).

Example 2

Samples were prepared in accordance with Example 1, except that actual produced water sourced from the Eagle Ford shale that was diluted to 3% using deionized water was used in the samples. Results are shown in Table 2.

TABLE 2

| Treatment | Total H2S (ppm) |
|---|---|
| Control 1 | 6190 |
| 250 ppm 12:3 Glut/Quat Biocide | 7 |
| NRB Program (480 ppm CaNO3) | 83 |
| 20 ppm MoO4 | 3188 |
| 50 ppm MoO4 | 234 |
| 80 ppm MoO4 | 172 |
| 100 ppm MoO4 | 107 |
| 150 ppm MoO4 | 160 |
| 200 ppm MoO4 | 110 |

As shown in Table 2, molybdate alone caused a strong reduction in $H_2S$ formation even at lower concentrations. At concentrations of just 50 ppm and above, molybdate was competitive with other proven treatments—Glut/Quat biocide and NRB treatment (480 ppm $Ca(NO_3)_2$ with 1 ppm live NRB culture).

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples. Other and further embodiments, versions and examples of the disclosure may be devised without departing from the basic scope thereof and the scope thereof is determined by the claims that follow.

What is claimed is:

1. A process comprising:
   injecting a fluid consisting of molybdate or molybdate salt into a hydrocarbon-bearing formation, wherein no biocide is injected into the formation wherein the molybdate or molybdate salt is present in the fluid in an amount from 5 to about 500 ppm by weight of the fluid.

2. The process of claim 1, wherein the molybdate or molybdate salt is present in the fluid in an amount from between 20 and 250 ppm by weight of fluid.

3. The process of claim 1, wherein the hydrocarbon-bearing formation further comprises a fracturing fluid or produced water.

4. The method of claim 1, wherein no nitrate reducing bacteria are injected into the formation.

5. The process of claim 1 further comprising prior to the step of injecting the molybdate or molybdate salt:
   combining the molybdate or molybdate salt with the fluid.

* * * * *